(12) United States Patent
Teranishi et al.

(10) Patent No.: US 11,618,803 B2
(45) Date of Patent: *Apr. 4, 2023

(54) THERMOSETTING RESIN COMPOSITION, PREPREG, AND FIBER-REINFORCED COMPOSITE MATERIAL AND PRODUCTION METHOD THEREFOR

(71) Applicant: Mitsubishi Chemical Corporation, Chiyoda-ku (JP)

(72) Inventors: Takuya Teranishi, Tokyo (JP); Masahiro Ichino, Tokyo (JP); Akira Oota, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 151 days.

This patent is subject to a terminal disclaimer.

(21) Appl. No.: 17/202,419

(22) Filed: Mar. 16, 2021

(65) Prior Publication Data

US 2021/0198440 A1 Jul. 1, 2021

Related U.S. Application Data

(63) Continuation of application No. 16/861,289, filed on Apr. 29, 2020, now Pat. No. 10,988,589, which is a continuation of application No. PCT/JP2018/040504, filed on Oct. 31, 2018.

(30) Foreign Application Priority Data

Nov. 16, 2017 (JP) .............................. JP2017-220688

(51) Int. Cl.
C08G 65/24 (2006.01)
C08J 5/04 (2006.01)
C08K 5/3445 (2006.01)
C08L 63/00 (2006.01)
C08J 5/24 (2006.01)

(52) U.S. Cl.
CPC .............. *C08G 65/24* (2013.01); *C08J 5/042* (2013.01); *C08J 5/243* (2021.05); *C08J 5/249* (2021.05); *C08K 5/3445* (2013.01); *C08L 63/00* (2013.01)

(58) Field of Classification Search
CPC . C08G 65/24; C08J 5/243; C08J 5/249; C08J 5/042; C08K 5/3445; C08L 63/00
See application file for complete search history.

(56) References Cited

U.S. PATENT DOCUMENTS

| | | | |
|---|---|---|---|
| 10,988,589 B2 * | 4/2021 | Teranishi | ............. C08K 5/3445 |
| 2006/0035088 A1 | 2/2006 | Takano et al. | |
| 2014/0107254 A1 | 4/2014 | Iwata et al. | |
| 2015/0191592 A1 | 7/2015 | Ishimoto et al. | |
| 2018/0155489 A1 | 6/2018 | Ushiyama et al. | |

FOREIGN PATENT DOCUMENTS

| | | |
|---|---|---|
| CN | 107033550 A | 8/2017 |
| EP | 3 309 190 A1 | 4/2018 |
| EP | 3 611 210 A1 | 2/2020 |
| EP | 3 632 952 A1 | 4/2020 |
| JP | 56-104925 A | 8/1981 |
| JP | 60-54860 B2 | 12/1985 |
| JP | 2-145676 A | 6/1990 |
| JP | 2011-79983 A | 4/2011 |
| JP | 2012-233133 A | 11/2012 |
| JP | 2017-2202 A | 1/2017 |
| JP | 2018-172603 A | 11/2018 |
| WO | WO 2004/048435 A1 | 6/2004 |
| WO | WO 2011/061910 A1 | 5/2011 |
| WO | WO 2014/030636 A1 | 2/2014 |
| WO | WO 2016/087935 A1 | 6/2016 |
| WO | WO 2016/199857 A1 | 12/2016 |
| WO | WO 2018/190329 A1 | 10/2018 |
| WO | WO 2018/216643 A1 | 11/2018 |

OTHER PUBLICATIONS

Combined Chinese Office Action and Search Report dated Apr. 20, 2022 in Patent Application No. 201880070429.4 (with English machine translation), 31 pages.
Japanese Office Action dated May 25, 2021 in Japanese Patent Application No. 2020-154797 (with English Machine Translation obtained by Global Dossier), 4 pages.
International Search Report dated Jan. 29, 2019 in PCT/JP2018/040504 filed Oct. 31, 2018, 2 pages.
Japanese Office Action dated Sep. 3, 2019 in Japanese Application 2018-561737 (with English Translation), 10 pages.
Japanese Office Action dated Mar. 10, 2020 in Japanese Application 2018-561737 (with English Translation), 14 pages.
Extended European Search Report dated Oct. 27, 2020 in European Patent Application No. 1887422.8, 8 pages.

* cited by examiner

*Primary Examiner* — Edward J Cain

(74) *Attorney, Agent, or Firm* — Oblon, McClelland, Maier & Neustadt, L.L.P.

(57) ABSTRACT

Provided is a thermosetting resin composition which achieves both high heat resistance and high bending strength as a fiber-reinforced composite material, and also has rapid curability that enables high cycle press forming, thermal stability, and storage stability. The thermosetting resin composition of the present invention is a thermosetting resin composition comprising an epoxy resin, an epoxy resin curing agent, an imidazole compound, and an epoxy resin curing accelerator, in which the epoxy resin curing agent is dicyandiamide or a derivative thereof, and the epoxy resin curing accelerator comprises a urea derivative having two or more dimethylureido groups in a molecule.

16 Claims, 3 Drawing Sheets

THERMOSETTING RESIN COMPOSITION, PREPREG, AND FIBER-REINFORCED COMPOSITE MATERIAL AND PRODUCTION METHOD THEREFOR

CROSS REFERENCE TO RELATED APPLICATIONS

This application is a continuation application of U.S. application Ser. No. 16/861,289, filed Apr. 29, 2020, the disclosure of which is incorporated herein by reference in its entirety. U.S. application Ser. No. 16/861,289 is a continuation application of PCT/JP2018/040504 filed Oct. 31, 2018, the disclosure of which is incorporated herein by reference in its entirety. U.S. application Ser. No. 16/861,289 claims priority to Japanese Application No. 2017-220688, the disclosure of which is incorporated herein by reference in its entirety.

TECHNICAL FIELD

The present invention relates to a thermosetting resin composition, a prepreg, and a fiber-reinforced composite material and a production method therefor.

This application is a continuation application of International Application No. PCT/JP2018/040504, filed on Oct. 31, 2018, which claims the benefit of priority of the prior Japanese Patent Application No. 2017-220688, filed Nov. 16, 2017, the content of which are incorporated herein by reference.

BACKGROUND ART

Fiber-reinforced composite materials containing reinforcing fibers and a matrix resin composition are widely used in industrial applications such as vehicles by reason of excellent mechanical properties and the like, and in recent years, the application range thereof has been further widened.

For example, a fiber-reinforced composite material formed by heating and pressing a prepreg laminate in which a plurality of sheet-like prepregs having reinforcing fibers impregnated with a matrix resin composition are laminated is known.

As the matrix resin composition, a thermosetting resin composition containing a phenol resin, a melamine resin, a bismaleimide resin, an unsaturated polyester resin, an epoxy resin, or the like is often used from the viewpoint of excellent impregnation properties and heat resistance.

Particularly, an epoxy resin composition has been widely used because a fiber-reinforced composite material having excellent heat resistance and formability and higher mechanical strength can be obtained.

As a forming method frequently used for vehicles, high cycle press forming is known (Patent Literature 1).

In high cycle press forming, in order to enable mass production of products, the products are cured under a high pressure at about 100° C. to 150° C. for a period of time as short as about several minutes to tens of minutes.

A resin composition used for the high cycle press forming is required to have rapid curability that enables curing within a period of time as short as about several minutes to tens of minutes at about 100° C. to 150° C., thermal stability in which the viscosity properties of the resin do not change while a reinforcing fiber base material is impregnated with the resin composition, and storage stability during storage. However, rapid curability, and thermal stability and storage stability are contradictory properties, and it has been difficult to satisfy all the properties.

In addition, in high cycle press forming, a formed article has heat resistance higher than a forming temperature in order to prevent deformation at the time of demolding. Furthermore, since the use applications of the formed article have been widened, a formed article resistant to high-temperature heat is required.

In general, although the heat resistance of a cured product of an epoxy resin and an imidazole-based compound is high, in a case where an epoxy resin composition containing an imidazole-based compound is used, the bending strength (for example, 90-degree bending strength) of the obtained fiber-reinforced composite material becomes a problem. That is, the cured product of the epoxy resin composition containing the imidazole-based compound has poor adhesion to a reinforcing fiber base material. Therefore, in case of the fiber-reinforced composite material, fracture is likely to occur at the interface between the cured product of the epoxy resin composition and the reinforcing fiber base material.

On the other hand, in a case where dicyandiamide or a derivative thereof is used as a curing agent, the adhesion to the reinforcing fiber base material is strong, and high strength can be exhibited in a bending test (for example, a 90-degree bending test) of the obtained fiber-reinforced composite material. However, in the case where dicyandiamide or a derivative thereof is used as the curing agent, the heat resistance of the cured product is not high.

Patent Literature 2 discloses an example in which an imidazole-based compound, and dicyandiamide or a derivative thereof are used as a curing agent.

CITATION LIST

Patent Literature

[Patent Literature 1]
International publication under the PCT numbered WO 2004/48435
[Patent Literature 2]
International publication under the PCT numbered WO 2016/199857

SUMMARY OF INVENTION

Technical Problem

However, the heat resistance of the thermosetting resin compositions disclosed in these literatures is not high. Furthermore, in high cycle press forming, compatibility between heat resistance and bending properties has not been achieved.

The present invention has been made in view of the above problems, and an object thereof is to provide a thermosetting resin composition which achieves both high heat resistance and high bending strength as a fiber-reinforced composite material, and also has rapid curability, thermal stability, and storage stability that enable high cycle press forming, and a prepreg, and a fiber-reinforced composite material using the same.

Solution to Problem

The present invention has the following aspects.

[1] A thermosetting resin composition comprising: an epoxy resin; an epoxy resin curing agent; an imidazole compound; and an epoxy resin curing accelerator, wherein
the epoxy resin curing agent is dicyandiamide or a derivative thereof, and
the epoxy resin curing accelerator comprises a urea derivative having two or more dimethylureido groups in a molecule.

[2] The thermosetting resin composition according to [1], wherein a curing completion time measured by a curelastometer is 6 minutes or shorter at 140° C.

[3] The thermosetting resin composition according to [1] or [2], wherein, when a viscosity after holding at 60° C. for 5 minutes is V0 and a viscosity after holding at 60° C. for 5 hours is V1, V1/V0 is 1.0 to 4.5.

[4] The thermosetting resin composition according to any one of [1] to [3], wherein the imidazole compound comprises an imidazole compound having a curing start temperature of 100° C. or higher,

[Curing Start Temperature of Imidazole Compound]

A curing start temperature of an imidazole compound is a temperature at an intersection between a tangent at an inflection point and a baseline in a DSC curve which is obtained by measuring a caorific value by a differential scanning calorimeter (DSC) at a temperature rising rate of 10° C./min of a sample resin composition prepared by mixing 10 parts by mass of the imidazole compound with 100 parts by mass of a bisphenol A type epoxy resin having an epoxy equivalent weight of 180 to 220.

[5] The thermosetting resin composition according to any one of [1] to [4], wherein the imidazole compound comprises one selected from the group consisting of an imidazole derivative, an imidazole adduct, an inclusion compound of imidazole, a microencapsulated imidazole, and an addition product comprising imidazole.

[6] The thermosetting resin composition according to [5], wherein the imidazole compound comprises the addition product comprising imidazole, and the addition product comprising imidazole is an isocyanuric acid addition product of imidazole or an isocyanuric acid addition product of an imidazole derivative.

[7] The thermosetting resin composition according to any one of [1] to [6], wherein the urea derivative having two or more dimethylureido groups in a molecule comprises one or both of 2,4-bis(3,3-dimethylureido)toluene and 4,4'-methylene bis(phenyldimethylurea).

[8] The thermosetting resin composition according to any one of [1] to [7], the thermosetting resin composition comprising:
1 to 9 parts by mass of dicyandiamide or a derivative thereof,
1 to 8 parts by mass of the imidazole compound, and
1 to 8 parts by mass of the urea derivative having two or more dimethylureido groups in a molecule with respect to 100 parts by mass of the epoxy resin.

[9] The thermosetting resin composition according to any one of [1] to [8], wherein the epoxy resin comprises a polyfunctional epoxy resin having three or more epoxy groups in a molecule.

[10] The thermosetting resin composition according to [9], wherein the polyfunctional epoxy resin having three or more epoxy groups in a molecule comprises one selected from the group consisting of a phenol novolac type epoxy resin, a trisphenolmethane type epoxy resin, and tetraglycidyl diaminodiphenylmethane.

[11] The thermosetting resin composition according to any one of [1] to [10], wherein the epoxy resin comprises 30 to 70 parts by mass of an epoxy resin having a structure represented by Formula (1) in a molecule, and 20 to 40 parts by mass of a polyfunctional epoxy resin having three or more epoxy groups in a molecule without having the structure represented by Formula (1), in 100 parts by mass of the epoxy resin.

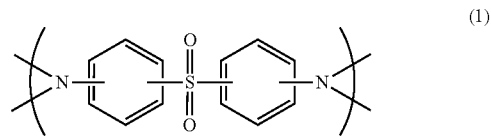

[12] A prepreg comprising: the thermosetting resin composition according to any one of [1] to [11]; and a reinforcing fiber base material.

[13] A fiber-reinforced composite material which is a cured product of the prepreg according to [12].

[14] A production method of a fiber-reinforced composite material comprising: producing a preform having a near net shape of a desired formed article shape by shaping one sheet or two or more overlapping sheets of the prepreg according to [12]; and performing heating and pressurization forming on the preform into the desired formed article shape.

[15] The thermosetting resin composition according to any one of [1] to [11], which is used for a vehicle material.

Advantageous Effects of Invention

According to the present invention, a thermosetting resin composition which gives a fiber-reinforced composite material with both high heat resistance and high bending strength and such a fiber-reinforced composite material may be obtained.

Furthermore, the thermosetting resin composition of the present invention also has rapid curability that enables high cycle press forming, and thermal stability and storage stability required for a prepreg.

DESCRIPTION OF EMBODIMENTS

Figure 1:
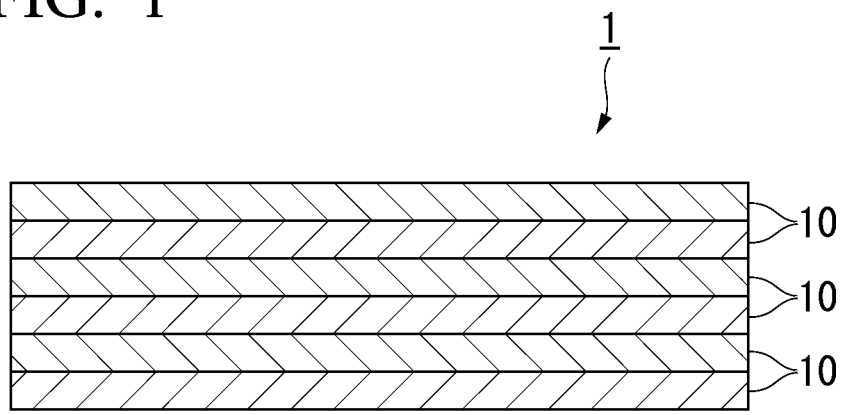
FIG. 1 is a cross-sectional view illustrating an example of a prepreg laminate.

Hereinafter, preferred embodiments of the present invention will be described, but the present invention is not limited to only these embodiments.

<<Thermosetting Resin Composition>>

A thermosetting resin composition of the present invention contains an epoxy resin, an epoxy resin curing agent, an imidazole compound, and an epoxy resin curing accelerator.

Here, the epoxy resin curing agent is dicyandiamide or a derivative thereof.

The epoxy resin curing accelerator contains a urea derivative having two or more dimethylureido groups in a molecule.

By using dicyandiamide or a derivative thereof as the epoxy resin curing agent, the mechanical properties of a cured product of the thermosetting resin composition are improved.

By using the imidazole compound, the curing rate of the thermosetting resin composition is improved, and the mechanical properties of the obtained cured product are improved.

By using the urea derivative having two or more dimethylureido groups in a molecule as the epoxy resin curing accelerator, the low-temperature curability and rapid curability of the thermosetting resin composition are improved.

The thermosetting resin composition of the present invention can achieve both rapid curability and storage stability by containing all of dicyandiamide or a derivative thereof, the imidazole compound, and the urea derivative having two or more dimethylureido groups in a molecule.

[Epoxy Resin]

As the epoxy resin used in the present invention, there is a compound having an epoxy group in a molecule. A compound having two or more epoxy groups in a molecule is preferable because the obtained cured resin product has high heat resistance and high mechanical properties.

Examples of the epoxy resin include: a glycidyl ether type epoxy resin obtained from a compound having a hydroxyl group in a molecule and epichlorohydrin; a glycidyl amine type epoxy resin obtained from a compound having an amino group in a molecule and epichlorohydrin; a glycidyl ester type epoxy resin obtained from a compound having a carboxyl group in a molecule and epichlorohydrin; an alicyclic epoxy resin obtained by oxidizing a compound having a double bond in a molecule; an epoxy resin having a heterocyclic structure; and an epoxy resin in which two or more types of groups selected from these are mixed in a molecule.

As an epoxy resin other than these, an epoxy resin having a structure represented by Formula (1) in a molecule can also be used.

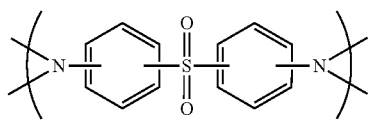

(1)

One of the epoxy resins may be used alone, or two or more thereof may be used in combination.

(Glycidyl Ether Type Epoxy Resin)

Specific examples of the glycidyl ether type epoxy resin include: an aryl glycidyl ether type epoxy resin such as a bisphenol A type epoxy resin, a bisphenol F type epoxy resin, a bisphenol S type epoxy resin, a resorcinol type epoxy resin, a phenol novolac type epoxy resin, a trisphenolmethane type epoxy resin, a naphthalene type epoxy resin, and an anthracene type epoxy resins; a polyethylene glycol type epoxy resin; a polypropylene glycol type epoxy resin; a dicyclopentadiene type epoxy resin; and positional isomers thereof or substituted products with alkyl groups or halogens.

Examples of commercial products of the bisphenol A type epoxy resin include: EPON 825; jER (registered trademark; the same applies hereinafter) 826, jER 827, and jER 828 (all manufactured by Mitsubishi Chemical Corporation); EPICLON (registered trademark; the same applies hereinafter) 850 (manufactured by DIC Corporation); EPOTOHTO (registered trademark; the same applies hereinafter) YD-128 (manufactured by NIPPON STEEL Chemical & Material Co., Ltd.); DER-331 and DER-332 (both manufactured by The Dow Chemical Company); and Bakelite EPR 154, Bakelite EPR 162, Bakelite EPR 172, Bakelite EPR 173, and Bakelite EPR 174 (all manufactured by Bakelite AG).

Examples of commercial products of the bisphenol F type epoxy resin include: jER 806, jER 807, and jER 1750 (all manufactured by Mitsubishi Chemical Corporation); EPICLON 830 (manufactured by DIC Corporation); EPOTOHTO YD-170 and EPOTOHTO YD-175 (both manufactured by NIPPON STEEL Chemical & Material Co., Ltd.); Bakelite EPR169 (manufactured by Bakelite AG); and GY 281, GY 282, and GY 285 (all manufactured by Huntsman Advanced Materials).

Examples of commercial products of the bisphenol S type epoxy resin include EPICLON EXA-1514 (manufactured by DIC Corporation).

Examples of commercial products of the resorcinol type epoxy resin include DENACOL (registered trademark; the same applies hereinafter) EX-201 (manufactured by Nagase ChemteX Corporation).

Examples of commercial products of the phenol novolac type epoxy resin include: jER 152 and jER 154 (both manufactured by Mitsubishi Chemical Corporation); EPICLON N-740 (manufactured by DIC Corporation); and EPN 179 and EPN 180 (both manufactured by Huntsman Advanced Materials).

Examples of commercial products of the trisphenolmethane type epoxy resin include: Tactix (registered trademark; the same applies hereinafter) 742 (manufactured by Huntsman Advanced Materials); EPPN (registered trademark; the same applies hereinafter) 501H, EPPN 501HY, EPPN 502H, and EPPN 503H (all manufactured by Nippon Kayaku Co., Ltd.); and jER 1032H60 (manufactured by Mitsubishi Chemical Corporation).

Examples of commercial products of the naphthalene type epoxy resin include: HP-4032 and HP-4700 (both manufactured by DIC Corporation); and NC-7300 (manufactured by Nippon Kayaku Co., Ltd.).

Examples of commercial products of the dicyclopentadiene type epoxy resins include XD-100 (manufactured by Nippon Kayaku Co., Ltd.) and HP 7200 (manufactured by DIC Corporation).

Examples of commercial products of the anthracene type epoxy resin include YL7172YX-8800 (manufactured by Mitsubishi Chemical Corporation).

(Glycidyl Amine Type Epoxy Resin)

Specific examples of the glycidyl amine type epoxy resin include tetraglycidyl diaminodiphenylmethanes, a glycidyl compound of aminophenol, a glycidyl compound of aminocresol, glycidylanilines, and a glycidyl compound of xylenediamine.

Examples of commercial products of the tetraglycidyl diaminodiphenylmethanes include: SUMI-EPDXY (registered trademark; the same applies hereinafter) ELM 434 (manufactured by Sumitomo Chemical Company); ARALDITE (registered trademark; the same applies hereinafter) MY 720, ARALDITE MY 721, ARALDITE MY 9512, ARALDITE MY 9612, ARALDITE MY 9634, and ARALDITE MY 9663 (manufactured by Huntsman Advanced Materials Co., Ltd.); jER 604 (manufactured by Mitsubishi Chemical Corporation); and Bakelite EPR 494, Bakelite EPR 495, Bakelite EPR 496, and Bakelite EPR 497 (all manufactured by Bakelite AG).

Examples of commercial products of the glycidyl compound of aminophenol and the glycidyl compound of aminocresol include: jER 630 (manufactured by Mitsubishi Chemical Corporation); ARALDITE MY 0500, ARALDITE MY 0510, ARALDITE MY 0600 (all manufactured by Huntsman Advanced Materials); and SUMI-EPDXY ELM 120 and SUMI-EPDXY ELM 100 (all manufactured by Sumitomo Chemical Company).

Examples of commercial products of the glycidylanilines include: GAN (registered trademark; the same applies hereinafter) and GOT (registered trademark; the same applies hereinafter) (manufactured by Nippon Kayaku Co., Ltd.); and Bakelite EPR 493 (manufactured by Bakelite AG).

Examples of the glycidyl compound of xylenediamine include TETRAD (registered trademark; the same applies hereinafter)-X (manufactured by Mitsubishi Gas Chemical Company, Inc.).

(Glycidyl Ester Type Epoxy Resin)

Specific examples of the glycidyl ester type epoxy resin include phthalic acid diglycidyl ester, hexahydrophthalic acid diglycidyl ester, isophthalic acid diglycidyl ester, dimer acid diglycidyl ester, and isomers of kinds thereof.

Examples of commercial products of the phthalic acid diglycidyl ester include: EPOMIK (registered trademark; the same applies hereinafter) R508 (manufactured by Mitsui Chemicals, Inc.) and DENACOL (registered trademark; the same applies hereinafter) EX-721 (manufactured by Nagase ChemteX Corporation).

Examples of commercial products of the hexahydrophthalic acid diglycidyl ester include EPOMIK R540 (manufactured by Mitsui Chemicals, Inc.) and AK-601 (manufactured by Nippon Kayaku Co., Ltd.).

Examples of commercial products of the dimer acid diglycidyl ester include jER 871 (manufactured by Mitsubishi Chemical Corporation) and EPOTOHTO YD-171 (manufactured by NIPPON STEEL Chemical & Material Co., Ltd.).

(Alicyclic Epoxy Resin)

Specific examples of the alicyclic epoxy resin include a compound having a 1,2-epoxycyclohexane ring as a partial structure.

Examples of commercial products of the compound having a 1,2-epoxycyclohexane ring as a partial structure include: CELLOXIDE (registered trademark; the same applies hereinafter) 2021P, CELLOXIDE 2081, and CELLOXIDE 3000 (all manufactured by Daicel Corporation); and CY 179 (manufactured by Huntsman Advanced Materials).

(Epoxy Resin Having Heterocyclic Structure)

Specific examples of the epoxy resin having a heterocyclic structure include a compound having an oxazolidone ring as a partial structure, and a compound having a xanthene skeleton as a partial structure.

Examples of commercial products of the compound having an oxazolidone ring as a partial structure include: AER (registered trademark; the same applies hereinafter) 4152, AER 4151, LSA 4311, LSA 4313, and LSA 7001 (all manufactured by Asahi Kasei E-Materials Co.); and EPICLON TSR-400 (manufactured by DIC Corporation).

Examples of commercial products of the compound having a xanthene skeleton as a partial structure include EXA-7335 (manufactured by DIC Corporation).

(Epoxy Resin Having Structure Represented by Formula (1))

Examples of the epoxy resin having a structure represented by Formula (1) include a reaction product of an epoxy resin and an amine compound having at least one sulfur atom in a molecule.

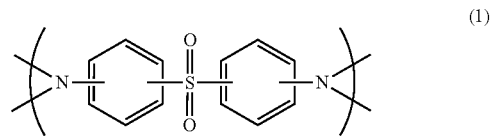

Examples of the epoxy resin having the structure represented by Formula (1) include 4,4'-diaminodiphenylsulfone, 3,3'-diaminodiphenylsulfone, bis(4-(4-aminophenoxy)phenyl)sulfone, bis(4-(3-aminophenoxy)phenyl)sulfone, and derivatives thereof.

Among these, from the viewpoint of heat resistance of the cured resin, it is preferable to use diaminodiphenylsulfone, and it is more preferable to use 4,4'-diaminodiphenylsulfone.

Examples of the epoxy resin preferably used include a bisphenol type epoxy resin such as a bisphenol A type epoxy resin and a bisphenol F type epoxy resin. Among these, a bisphenol A type epoxy resin is preferable.

As a method for obtaining the epoxy resin having the structure represented by Formula (1), there is a method of mixing an epoxy resin with an amine compound having at least one sulfur atom in a molecule, specifically, an amine compound having the structure represented by Formula (1) in a mass ratio of 100:3 to 100:30, preferably 100:5 to 100:20, and heating the mixture at 130° C. to 200° C., preferably 140° C. to 170° C. to cause a reaction.

In a case where this method is used, unreacted epoxy resin and the amine compound may remain in the reaction product, but there is no particular need to remove these residues.

By using the epoxy resin having the structure represented by Formula (1) as the epoxy resin in the thermosetting resin composition of the present invention, the viscosity of the thermosetting resin composition can be easily adjusted, which is preferable.

That is, by adjusting the reaction conditions of the epoxy resin and the amine compound having at least one sulfur atom in a molecule, for example, by setting the reaction conditions to a high temperature and a long period of time, the viscosity of the obtained reaction product can be increased, or by setting the reaction conditions to a low temperature and a short period of time, the viscosity of the obtained reaction product can be controlled to be low. Therefore, the viscosity of the thermosetting resin composition can be adjusted by mixing the epoxy resin containing the reaction product having a desired viscosity in the thermosetting resin composition. In addition, by using the epoxy resin having the structure represented by Formula (1) for the thermosetting resin composition, rapid curability suitable for high cycle press forming is easily obtained, and a cured product of the thermosetting resin composition easily obtains high mechanical properties.

It is preferable that the epoxy resin in the thermosetting resin composition of the present invention contains the epoxy resin having the structure represented by Formula (1) and a polyfunctional epoxy resin having three or more epoxy groups in a molecule. As the polyfunctional epoxy resin having three or more epoxy groups in a molecule, a polyfunctional epoxy resin that does not have the structure represented by Formula (1) and contains three or more epoxy groups in a molecule is preferable.

Examples of the polyfunctional epoxy resin having three or more epoxy groups in a molecule include a phenol novolac type epoxy resin, a cresol novolac type epoxy resin, a trisphenolmethane type epoxy resin, tetraglycidyl diaminodiphenylmethanes, a glycidyl compound of aminophenol, and a glycidyl compound of aminocresol.

Among these, a phenol novolac type epoxy resin, a trisphenolmethane type epoxy resin, and a tetraglycidyl diaminodiphenylmethane are preferable from the viewpoint of exhibiting high heat resistance and high mechanical properties.

In a case where a material containing different numbers of epoxy groups in the molecule, such as a phenol novolac type epoxy resin, is contained, by fractionation through GPC, the amount of the polyfunctional epoxy resin having three or more epoxy groups in a molecule is calculated.

The amount of the epoxy resin having the structure represented by Formula (1) is preferably 30 to 70 parts by mass, and more preferably 40 to 65 parts by mass with respect to 100 parts by mass of the epoxy resin in the thermosetting resin composition.

When the amount of the epoxy resin having the structure represented by Formula (1) is equal to or more than the lower limit, rapid curability and high mechanical properties are easily obtained. When the amount of the epoxy resin having the structure represented by Formula (1) is equal to or less than the upper limit, a cured resin product having high heat resistance is easily obtained.

The amount of the polyfunctional epoxy resin having three or more epoxy groups in a molecule is preferably 20 to 40 parts by mass, and more preferably 20 to 30 parts by mass with respect to 100 parts by mass of the epoxy resin in the thermosetting resin composition.

When the amount of the polyfunctional epoxy resin having three or more epoxy groups in a molecule is equal to or more than the lower limit, high heat resistance is easily obtained. When the amount of the polyfunctional epoxy resin having three or more epoxy groups in a molecule is equal to or less than the upper limit, high mechanical properties are easily obtained.

In addition, as will be described later, by using an epoxy resin that is liquid and an epoxy resin that is solid at room temperature in combination further with a thermoplastic resin as needed, the viscosity of the thermosetting resin composition can be adjusted to an optimal range.

The amount of the epoxy resin that is liquid at room temperature with respect to 100 parts by mass of the epoxy resin is preferably 10 to 90 parts by mass, and more preferably 60 to 90 parts by mass.

By causing the amount of the epoxy resin that is liquid at room temperature with respect to 100 parts by mass of the epoxy resin to be within the above range, the viscosity of the thermosetting resin composition can be set to an appropriate range.

Examples of commercial products of the epoxy resin that is liquid at room temperature include: a bisphenol A type epoxy resin such as jER 825, 826, 827, 828, and 834 (all manufactured by Mitsubishi Chemical Corporation), EPICLON 850 (manufactured by DIC Corporation), EPOTOHTO YD-128 (NIPPON STEEL Chemical & Material Co., Ltd.), DER-331 and DER-332 (manufactured by The Dow Chemical Company), and ARALDITE (registered trademark; the same applies hereinafter) LY556 (manufactured by Huntsman Advanced Materials);

a bisphenol F type epoxy resin such as jER 806, 807, and 1750 (manufactured by Mitsubishi Chemical Corporation), EPICLON 830 (manufactured by DIC Corporation), and EPOTOHTO YD-170 and EPOTOHTO YD-175 (manufactured by NIPPON STEEL Chemical & Material Co., Ltd.);

a phenol novolac type epoxy resin such as jER 152 (manufactured by Mitsubishi Chemical Corporation), EPICLON N-730A (manufactured by DIC Corporation), and DEN-425 (manufactured by The Dow Chemical Company);

an amine type epoxy resin such as jER 604 and 630 (both manufactured by Mitsubishi Chemical Corporation), and MY 0600 and MY 0500 (both manufactured by Huntsman Advanced Materials); and an alicyclic epoxy resin such as CELLOXIDE 2021P and CELLOXIDE 8000 (manufactured by Daicel Corporation).

One of these epoxy resins that are liquid at room temperature may be used alone, or two or more thereof may be used in combination.

As the epoxy resin that is liquid at room temperature, a bisphenol A type epoxy resin and a phenol novolac type epoxy resin are preferable from the viewpoint of excellent balance between toughness and heat resistance of a cured product.

The amount of the epoxy resin that is solid at room temperature with respect to 100 parts by mass of the epoxy resin is preferably 10 to 90 parts by mass, and more preferably 10 to 30 parts by mass.

By causing the amount of the epoxy resin that is solid at room temperature with respect to 100 parts by mass of the epoxy resin to be within the above range, the viscosity of the thermosetting resin composition can be set to an appropriate range.

Examples of commercial products of the epoxy resin that is solid at room temperature include: a phenol novolac type epoxy resin such as jER 154 and 157S70 (both manufactured by Mitsubishi Chemical Corporation), and EPICLON N-770, EPICLON N-740, and EPICLON N-775 (all manufactured by DIC Corporation); a cresol novolac type epoxy resin such as EPICLON N-660, EPICLON N-665, EPICLON N-670, EPICLON N-673, and EPICLON N-695 (all manufactured by DIC Corporation), and EOCN (registered trademark; the same applies hereinafter)-1020, EOCN-102S, and EOCN-104S (all manufactured by Nippon Kayaku Co., Ltd.); a bisphenol A type epoxy resin such as jER 1001, 1002, and 1003 (all manufactured by Mitsubishi Chemical Corporation);

a bisphenol F type epoxy resin such as jER 4004P and 4005P (both manufactured by Mitsubishi Chemical Corporation);

a trisphenolmethane type epoxy resin such as jER 1032H60 (manufactured by Mitsubishi Chemical Corporation);

a biphenyl type epoxy resin such as YX4000 and YL6121H (both manufactured by Mitsubishi Chemical Corporation);

a naphthalene type epoxy resin such as HP4700 (manufactured by DIC Corporation);

a dicyclopentadiene type epoxy resin such as HP 7200 (manufactured by DIC Corporation);

an epoxy resin having an oxazolidone ring skeleton, such as TSR-400 (manufactured by DIC Corporation), DER 858 (manufactured by The Dow Chemical Company), and AER 4152 (manufactured by Asahi Kasei E-Materials Co.); and a bisphenol S type epoxy resin such as EXA-1514 and EXA-1517 (manufactured by DIC Corporation).

In addition, as the epoxy resin that is solid at room temperature, an epoxy resin having the structure represented by Formula (1) in a molecule may be used.

By using the epoxy resin having the structure represented by Formula (1) in a molecule as the epoxy resin that is solid at room temperature, the curing time of the thermosetting resin composition can be easily reduced, and furthermore, a cured product of the thermosetting resin composition can easily obtain high mechanical properties.

One of these epoxy resins that are solid at room temperature may be used alone, or two or more thereof may be used in combination.

The molecular weight of the epoxy resin in the thermosetting resin composition of the present invention is preferably 200 to 3000, and more preferably 300 to 2000. When the molecular weight of the epoxy resin is within the above range, the thermosetting resin composition can be easily adjusted to a desired viscosity.

The molecular weight is a weight average molecular weight in terms of polystyrene measured by gel permeation chromatography.

<Molecular Weight Fractionation Conditions>

Under the following conditions, each component of the epoxy resin is fractionated and the molecular weight of the epoxy resin is calculated.

The weight average molecular weight of each fraction collected is taken as the molecular weight of the fraction, and the mass ratio of the fraction is calculated from the ratio of the peak area to the total peak area.

Equipment: HLC-8020 (component system) (manufactured by Tosoh Corporation)
Pump: DP-8020 (two computer-controlled dual pumps)
Online degasser: SD-8022
Autosampler: AS-8020
RI detector: RI-8020
UV detector: UV-8020
Fraction collector: FC-8020
Column: TSK-GEL G3000 (21.5 mm ID×60 cmL)×2+ Guard column attached
Flow rate: 4.0 ml/min (2.0 ml/min×2)
Mobile phase: chloroform
Column temperature: room temperature
Injection volume: 1.0 ml
Concentration: 6 mass %

The epoxy equivalent weight of the epoxy resin in the thermosetting resin composition of the present invention is preferably 120 to 300 g/eq, and more preferably 150 to 280 g/eq.

When the epoxy equivalent weight of the epoxy resin is equal to or more than the lower limit, the resin does not become too brittle, and high mechanical properties are easily obtained. When the epoxy equivalent weight of the epoxy resin is equal to or less than the upper limit, the heat resistance hardly decreases.

The epoxy equivalent weight means the molecular weight of the epoxy resin per epoxy group.

The amount of the epoxy resin in 100 parts by mass of the thermosetting resin composition of the present invention is preferably 60 to 95 parts by mass, more preferably 65 to 93 parts by mass, and even more preferably 70 to 90 parts by mass.

When the amount of the epoxy resin is equal to or more than the lower limit, mechanical properties are easily kept high. When the amount of the epoxy resin is equal to or less than the upper limit, the heat resistance at the time of curing hardly decreases.

[Epoxy Resin Curing Agent]

The epoxy resin curing agent in the thermosetting resin composition of the present invention is dicyandiamide or a derivative thereof.

Dicyandiamide and a derivative thereof have a high melting point, and the compatibility with the epoxy resin is suppressed in a low temperature range. In addition, by causing the epoxy resin composition to contain dicyandiamide or a derivative thereof, excellent pot life is obtained, and the mechanical properties of the cured resin product are easily improved.

Examples of the derivative of dicyandiamide include those in which dicyandiamide is bonded to various compounds such as an epoxy resin, a vinyl compound, an acrylic compound, and 9,10-dihydro-9-oxa-10-phosphaphenanthrene-10-oxide.

As the epoxy resin curing agent in the thermosetting resin composition of the present invention, one of these may be used alone, or two or more thereof may be used in combination. Moreover, dicyandiamide may be used in combination.

As the epoxy resin curing agent in the thermosetting resin composition of the present invention, dicyandiamide is preferable from the viewpoint of reactivity.

Commercial products may be used as dicyandiamide or a derivative thereof.

Examples of commercial products of dicyandiamide include DICY 7 and DICY 15 (both manufactured by Mitsubishi Chemical Corporation) and Dicyanex 1400F (manufactured by Evonic Corporation), but are not limited thereto.

The amount of dicyandiamide or a derivative thereof in 100 parts by mass of the thermosetting resin composition of the present invention is preferably 1 to 9 parts by mass, more preferably 3 to 8 parts by mass, and even more preferably 3.5 to 7 parts by mass.

When the amount of dicyandiamide or a derivative thereof is equal to or more than the lower limit, the epoxy resin contained in the epoxy resin composition can be sufficiently cured. When the amount of dicyandiamide or a derivative thereof is equal to or less than the upper limit, storage stability is easily secured, and the toughness of the cured resin product is easily increased.

[Imidazole Compound]

The imidazole compound in the thermosetting resin composition of the present invention is a compound having an imidazole ring in a molecule, and is preferably at least one selected from the group consisting of a compound having a substituent on the imidazole ring (hereinafter, also referred to as "imidazole derivative"), a compound having a structure with imidazole or an imidazole derivative added to an epoxy group of an epoxy resin by ring opening (hereinafter, also referred to as "imidazole adduct"), a compound in which imidazole or an imidazole derivative is included by a different molecule (hereinafter, also referred to as "inclusion compound of imidazole"), a microencapsulated imidazole or imidazole derivative (hereinafter, also referred to as "microencapsulated imidazole"), and imidazole or an imidazole derivative coordinated with a stabilizer or the like (hereinafter, also referred to as "addition product comprising imidazole").

Among these, as the imidazole compound in the thermosetting resin composition of the present invention, an imidazole compound having a curing start temperature of 100° C. or higher is preferably used.

The imidazole compound having a curing start temperature of 100° C. or higher has low reactivity at a relatively low temperature such as room temperature, and an epoxy resin composition containing the imidazole compound having a curing start temperature of 100° C. or higher has high thermal stability. Therefore, the epoxy resin composition containing the imidazole compound having a curing start temperature of 100° C. or higher and a prepreg containing the same have high storage stability. On the other hand, at a forming temperature of the epoxy resin composition, high curability and curing acceleration are exhibited.

The curing start temperature of the imidazole compound in the thermosetting resin composition of the present invention is more preferably 110° C. or higher.

The curing start temperature is a value measured by the following method.

<Curing Start Temperature of Imidazole Compound>

A curing start temperature of an imidazole compound is a temperature at an intersection between a tangent at an inflection point and a baseline in a DSC curve which is obtained by measuring a caorific value by a differential scanning calorimeter (DSC) at a temperature rising rate of 10° C./min of a sample resin composition prepared by mixing 10 parts by mass of the imidazole compound with 100 parts by mass of a bisphenol A type epoxy resin having an epoxy equivalent weight of 180 to 220.

As the imidazole compound having a curing start temperature of 100° C. or higher, there are an imidazole derivative, an imidazole adduct, an inclusion compound of imidazole, a microencapsulated imidazole, an addition product comprising imidazole, and the like.

One of these imidazole compounds may be used alone, or two or more thereof may be used in combination.

Examples of the imidazole derivative having a curing start temperature of 100° C. or higher include 2,4-diamino-6-[2'-methylimidazolyl-(1')]-ethyl-s-triazine, 1-cyanoethyl-2-phenylimidazoliumtrimellitate, 2-phenyl-4,5-dihydroxymethylimidazole, and 2-phenyl-4-methyl-5-hydroxymethylimidazole.

Specific examples of the imidazole derivative before the adduct treatment, the inclusion treatment with a different molecule, and the microencapsulation treatment include 2-methylimidazole, 2-ethyl-4-methylimidazole, 2-undecylimidazole, 2-heptadecylimidazole, 1,2-dimethylimidazole, 2-phenylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-ethyl-4-methylimidazoliumtrimellitate, 1-cyanoethyl-2-undecylimidazoliumtrimellitate, 1-cyanoethyl-2-phenylimidazoliumtrimellitate, 2,4-diamino-6-(2'-methylimidazolyl-(1'))ethyl-s-triazine, 2,4-diamino-6-(2'-undecylimidazolyl-(1'))-ethyl-s-triazine, 2,4-diamino-6-(2'-ethyl-4-methylimidazolyl-(1'))-ethyl-s-triazine, 1-cyanoethyl-2-phenyl-4,5-di(2-cyanoethoxy)methylimidazole, 2-phenyl-4,5-dihydroxymethylimidazole, and 2-phenyl-4-methyl-5-hydroxymethylimidazole, but are not limited thereto.

Examples of the addition product comprising imidazole having a curing start temperature of 100° C. or higher include imidazole or an imidazole derivative coordinated with a stabilizer.

Preferable examples of the addition product comprising imidazole include those in which imidazole or an imidazole derivative is coordinated to a boric acid compound, isocyanuric acid, a metal atom, or the like to control the reactivity of the imidazole ring and the epoxy group.

Among these, an isocyanuric acid addition product of imidazole or an isocyanuric acid addition product of an imidazole derivative is preferable because stability in the epoxy resin is easily secured and the heat resistance of the cured product with the epoxy resin is hardly reduced.

Specific examples of the imidazole derivative before the addition of isocyanuric acid include 2-methylimidazole, 2-ethyl-4-methylimidazole, 2-undecylimidazole, 2-heptadecylimidazole, 1,2-dimethylimidazole, 2-phenylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-ethyl-4-methylimidazoliumtrimellitate, 1-cyanoethyl-2-undecylimidazoliumtrimellitate, 1-cyanoethyl-2-phenylimidazoliumtrimellitate, 2,4-diamino-6-(2'-methylimidazolyl-(1'))ethyl-s-triazine, 2,4-diamino-6-(2'-undecylimidazolyl-(1'))-ethyl-s-triazine, 2,4-diamino-6-(2'-ethyl-4-methylimidazolyl-(1'))-ethyl-s-triazine, 1-cyanoethyl-2-phenyl-4,5-di(2-cyanoethoxy)methylimidazole, 2-phenyl-4,5-dihydroxymethylimidazole, and 2-phenyl-4-methyl-5-hydroxymethylimidazole, but are not limited thereto.

In particular, because of their high stability and high curability, 2,4-diamino-6-(2'-methylimidazolyl-(1'))-ethyl-s-triazine/isocyanuric acid addition product, 2-phenylimidazole/isocyanuric acid addition product, 2-methylimidazole/isocyanuric acid addition product, 2-phenyl-4,5-dihydroxymethylimidazole/isocyanuric acid addition product, and 2-phenyl-4-methyl-5-hydroxymethylimidazole/isocyanuric acid addition product are preferable as the addition product comprising imidazole having a curing start temperature of 100° C. or higher.

From the viewpoint of more easily improving the storage stability, as a more preferable addition product comprising imidazole having a curing start temperature of 100° C. or higher, there is an isocyanuric acid addition product of an imidazole derivative having a triazine skeleton (triazine ring) in a molecule.

Examples of the isocyanuric acid addition product of an imidazole derivative having a triazine skeleton (triazine ring) in a molecule include 2,4-diamino-6-(2'-methylimidazolyl-(1'))-ethyl-s-triazine/isocyanuric acid addition product, 1-(4,6-diamino-s-triazine-2-yl)ethyl-2-undecylimidazole/isocyanuric acid addition product, and 2,4-diamino-6-[2-(2-ethyl-4-methyl-1-imidazolyl)ethyl]-s-triazine/isocyanuric acid addition product.

From the viewpoint of easily obtaining storage stability as a prepreg and rapid curability suitable for high cycle press forming, 2,4-diamino-6-(2'-methylimidazolyl-(1'))-ethyl-s-triazine/isocyanuric acid addition product is particularly preferable.

Examples of commercial products of the 2,4-diamino-6-(2'-methylimidazolyl-(1))-ethyl-s-triazine/isocyanuric acid addition product include 2MA-OK (manufactured by Shikoku Chemicals Corporation), but are not limited thereto.

Among these imidazole compounds having a curing start temperature of 100° C. or higher, an addition product comprising imidazole having a curing start temperature of 100° C. or higher is preferable from the viewpoint of easily securing stability and curability.

The imidazole compound in the thermosetting resin composition of the present invention is mixed in the thermosetting resin composition with dicyandiamide or a derivative thereof and the urea derivative having two or more dimethylureido groups in a molecule, thereby easily curing the thermosetting resin composition within a short period of time. Furthermore, by causing the thermosetting resin composition of the present invention to contain the imidazole compound, the heat resistance of the cured product is easily improved.

The amount of the imidazole compound in 100 parts by mass of the thermosetting resin composition of the present invention is preferably 1 to 8 parts by mass, more preferably 1 to 7 parts by mass, even more preferably 1 to 4 parts by mass, and particularly preferably 1.5 to 3 parts by mass.

When the amount of the imidazole compound is equal to or more than the lower limit, the curability of the thermosetting resin composition is easily improved, and the cured product tends to exhibit high heat resistance. When the amount of the imidazole compound is equal to or less than the upper limit, storage stability is hardly impaired, and mechanical properties are easily kept high.

Usually, an imidazole compound is a crystalline solid under the condition of room temperature (25° C.), and has low solubility in an epoxy resin at 100° C. or lower. Therefore, from the viewpoint of being favorably dispersed in the thermosetting resin composition and accelerating the curing reaction, the imidazole compound is preferably a powder having a volume average particle size of preferably 100 μm or less, and more preferably 20 μm or less.

The volume average particle size can be measured with a particle size analyzer (manufactured by Nikkiso Co., Ltd., product name: AEROTRAC SPR Model: 7340), and is taken as the value of D50 of the measured particle size distribution.

[Epoxy Resin Curing Accelerator]

The epoxy resin curing accelerator in the thermosetting resin composition of the present invention contains a urea derivative having two or more dimethylureido groups in a molecule.

The urea derivative having two or more dimethylureido groups in a molecule is not particularly limited as long as the urea derivative has two or more dimethylureido groups in a molecule and generates an isocyanate group and dimethylamine by being heated at a high temperature, and those generated activate the epoxy group of the epoxy resin and dicyandiamide or a derivative thereof. In a case where only one dimethylureido group is included in a molecule, a decrease in heat resistance due to a decrease in crosslink density occurs in the reaction with the epoxy resin.

Examples of the urea derivative include aromatic dimethylurea in which a dimethylureido group is bonded to an aromatic ring, and aliphatic dimethylurea in which a dimethylureido group is bonded to an aliphatic compound.

Among these, aromatic dimethylurea is preferable in that the curing rate is increased.

Examples of the aromatic dimethylurea having two or more dimethylureido groups in a molecule include methylene bis(phenyldimethylurea) and tolylene bis(dimethylurea). Specific examples thereof include 4,4'-methylene bis(phenyldimethylurea) (MBPDMU), 2,4-bis(3,3-dimethylureido)toluene (TBDMU), and 2,4-tolylene bis(N'-2,4,6-tribromophenylurea).

Among these, TBDMU is preferable because the curing accelerating ability is high and heat resistance can be easily imparted to the cured resin product.

These aromatic dimethylureas having two or more dimethylureido groups in a molecule may be used alone or two or more thereof may be used in combination.

Examples of the aliphatic dimethylurea having two or more dimethylureido groups in a molecule include dimethylurea obtained from isophorone diisocyanate and dimethylamine, dimethylurea obtained from m-xylylene diisocyanate and dimethylamine, and dimethylurea obtained from hexamethylene diisocyanate and dimethylamine.

As the urea derivative having two or more dimethylureido groups in a molecule, commercial products may be used.

Examples of commercial products of MBPDMU include Technicure MDU-11 (manufactured by A&C Catalysts, Inc.), and Omicure (registered trademark; the same applies hereinafter) (Omicure) 52 (manufactured by PTI Japan, Ltd.), but are not limited thereto.

Examples of commercial products of TBDMU include Omicure (Omicure) 24 (manufactured by PTI Japan, Ltd.), but are not limited thereto.

The amount of the urea derivative having two or more dimethylureido groups in a molecule in 100 parts by mass of the thermosetting resin composition of the present invention is preferably 1 to 8 parts by mass, more preferably 1 to 5 parts by mass, and even more preferably 1.5 to 4 parts by mass.

When the amount of the urea derivative having two or more dimethylureido groups in a molecule is equal to or more than the lower limit, the curing accelerating action of the epoxy resin contained in the epoxy resin composition can be easily sufficiently obtained. When the amount of the urea derivative having two or more dimethylureido groups in a molecule is equal to or less than the upper limit, a cured resin product excellent in storage stability, heat resistance, and mechanical properties is easily obtained.

Among the urea derivatives having two or more dimethylureido groups in a molecule, MBPDMU and TBDMU are crystalline solids under the condition of room temperature (25° C.), and have low solubility in an epoxy resin at 100° C. or lower. Therefore, from the viewpoint of being favorably dispersed in the thermosetting resin composition and accelerating the curing reaction, the urea derivative having two or more dimethylureido groups in a molecule is preferably a powder having a volume average particle size of preferably 100 μm or less, and more preferably 20 μm or less.

The volume average particle size can be measured in the same manner as the volume average particle size of the imidazole compound.

[Optional Components]

The thermosetting resin composition of the present invention may contain optional components that do not correspond to any of dicyandiamide or a derivative thereof, the imidazole compound, and the urea derivative having two or more dimethylureido groups in a molecule, within a range that does not impair the gist of the present invention.

However, as the optional components, other curing agents that are excellent in curability at low temperatures need to be added only in a small amount because the life of a resin film containing the thermosetting resin composition, that is, the period of time for which the resin film can be stored while holding its tackiness and flexibility, is shortened.

Furthermore, the thermosetting resin composition of the present invention may contain a thermoplastic resin in order to adjust the viscosity to an optimal range.

As the thermoplastic resin, a polyvinyl acetal resin, a polyvinyl alcohol resin, a phenoxy resin, a polysulfone, or a polyethersulfone, which has high solubility in an epoxy resin, is preferable.

Examples of commercial products of the thermoplastic resin include: DENKA BUTYRAL (manufactured by Denka Company Limited) as the polyvinyl acetal resin; DENKA POVAL (registered trademark; the same applies hereinafter) (manufactured by Denka Company Limited) and VINYLEC (registered trademark; the same applies hereinafter) (manufactured by Chisso Corporation) as the polyvinyl alcohol resin; YP-50 (manufactured by NIPPON STEEL Chemical & Material Co., Ltd.), YP-50s (manufactured by NIPPON STEEL Chemical & Material Co., Ltd.), and YP-70 (manufactured by NIPPON STEEL Chemical & Material Co., Ltd.) as the phenoxy resin; UDEL (registered trademark; the same applies hereinafter) (manufactured by Solvay Advanced Polymers) as the polysulfone; and Ultrason (registered trademark; the same applies hereinafter) (manufactured by BASF) as the polyethersulfone.

The amount of the thermoplastic resin in the thermosetting resin composition of the present invention is preferably 1 to 20 parts by mass, and more preferably 2 to 10 parts by mass, with respect to 100 parts by mass of the epoxy resin in the thermosetting resin composition.

When the amount of the thermoplastic resin is equal to or more than the lower limit, the effect of reducing tack at room temperature and suppressing resin flow during curing is easily exhibited. When the amount of the thermoplastic resin is equal to or less than the upper limit, the mechanical properties of the cured product are not easily impaired.

Furthermore, the thermosetting resin composition of the present invention may contain various additives, resins, fillers, and the like within a range that does not impair the gist of the present invention.

[Curing Completion Time of Thermosetting Resin Composition]

The curing completion time of the thermosetting resin composition of the present invention measured with a curelastometer is preferably 6 minutes or shorter, and more preferably 5 minutes or shorter at 140° C.

When curing is completed within the above-mentioned time, it can be said that rapid curability as a resin composition used for high cycle press forming is sufficiently provided.

The above properties can be achieved by using the imidazole compound and the urea derivative having two or more dimethylureido groups in a molecule in combination. By using an epoxy resin having a structure represented by Formula (1), rapid curability can be further improved.

The curelastometer applies a sinusoidal vibration with a predetermined amplitude that does not destroy the resin composition at a predetermined temperature to the resin composition, continuously measures the torque transmitted from the resin composition to an upper die, and records a change in viscoelastic stress during the curing reaction as a torque amplitude/time curve (cure curve).

For the curing completion time of the thermosetting resin composition of the present invention, a maximum torque value (Tmax) at which the torque value changes no longer is obtained from the cure curve, and a torque value of 90% of the maximum torque value (T90) is calculated. The time needed until T90 is reached after the start of the measurement is obtained, and this is taken as the curing completion time (t90).

[Viscosity of Thermosetting Resin Composition]

In the thermosetting resin composition of the present invention, when the viscosity after holding at 60° C. for 5 minutes is V0 and the viscosity after holding at 60° C. for 5 hours is V1, the viscosity ratio V1/V0 is preferably 1.0 to 4.5, more preferably 1.0 to 2.5, and even more preferably 1.0 to 2.0.

By causing the viscosity ratio of the thermosetting resin composition of the present invention to be within the above range, it is easy to prevent an increase in viscosity during the preparation of a resin or the production of a prepreg, which causes a difficulty in obtaining a good prepreg. In a case where an increase in viscosity is incurred during the preparation of a resin or during the production of a prepreg, the tack of the prepreg is lost and lamination cannot be achieved, or the prepreg cannot be sufficiently impregnated with the resin, so that voids remain inside the fiber-reinforced composite material or the smoothness of the surface is impaired, resulting in deterioration of appearance.

In general, the above properties can be achieved by adjusting the amount of the curing agent in the epoxy resin. However, in a case where the amount of the curing agent is reduced to cause the viscosity ratio V1/V0 to fall within the above range, the rapid curability is easily lost due to the decrease in the amount of the curing agent. That is, there are cases where it is difficult to maintain the rapid curability and to cause the viscosity ratio V1/V0 to fall within the above range by changing the amount of the curing agent.

On the other hand, by also using the imidazole compound, it is possible to achieve both rapid curability and the above-mentioned properties. From the viewpoint of improving the storage stability and rapid curability of the thermosetting resin composition, the imidazole compound preferably contains one selected from the group consisting of an imidazole derivative, an imidazole adduct, an inclusion compound of imidazole, a microencapsulated imidazole, and an addition product comprising imidazole. Among these, an addition product comprising imidazole is particularly preferable from the viewpoint of improving storage stability.

The viscosity at 30° C. of the thermosetting resin composition of the present invention is preferably $1.0 \times 10^2$ to $1.0 \times 10^5$ Pa·s, more preferably $5.0 \times 10^2$ to $9.8 \times 10^4$ Pa·s, and even more preferably $1.0 \times 10^3$ to $9.7 \times 10^4$ Pa·s.

When the viscosity of the thermosetting resin composition is equal to or more than the lower limit, the handleability of a resin film is likely to be excellent, and operations such as production, lamination, and forming of the resin film are facilitated. When the viscosity of the thermosetting resin composition is equal to or less than the upper limit, for example, during the production of a resin film containing a reinforcing fiber base material, which will be described later, the reinforcing fiber base material can be easily impregnated with the thermosetting resin composition, excessive heating is not necessary during the impregnation, and the drapability of the resin film is not easily impaired.

The viscosity of the thermosetting resin composition can be caused to fall within the above range by melt-mixing a solid thermosetting resin and a liquid thermosetting resin.

In the thermosetting resin composition of the present invention, in a viscosity measurement in which the initial temperature is 30° C. and the temperature is raised at 2.0° C./min, the temperature at which the lowest viscosity is obtained is preferably 100° C. to 130° C. In addition, the minimum viscosity in this case is preferably 0.1 Pa·s to 50 Pa·s, and more preferably from 0.5 Pa·s to 10 Pa·s.

When the temperature at which the minimum viscosity is obtained is within the above range, the flow rate of the thermosetting resin composition during forming can be easily suppressed to an appropriate range, and a formed article having excellent appearance is easily obtained. When the minimum viscosity in this case is within the above range, a formed article having good appearance is easily obtained. In particular, when the minimum viscosity is equal to or more than the lower limit, excessive flow is easily suppressed, and appearance defects such as irregularities on the surface of the formed article are less likely to occur. When the minimum viscosity is equal to or less than the upper limit, the thermosetting resin composition spreads to every corner of the die at the time of forming, and a formed article having good appearance is easily obtained.

The temperature at which the minimum viscosity is obtained can be set within the above range by selecting the type of the curing agent. The minimum viscosity in this case can be set within the above range by melt-mixing a solid thermosetting resin, a liquid thermosetting resin, a thermoplastic resin, and the like.

[Production Method for Thermosetting Resin Composition]

The thermosetting resin composition of the present invention can be produced by a known method. For example, a glass flask, a kneader, a planetary mixer, a general stirring and heating pot, or a stirring and pressure heating pot is preferably used for the production.

The thermosetting resin composition of the present invention is preferably produced by, for example, a production method having the following steps.

Step (1): a step in which an epoxy resin and an additive such as a thermoplastic resin are put into a dissolving container and heated and mixed at 70° C. to 150° C. for 1 to 6 hours, thereby obtaining an epoxy resin main ingredient.

Step (2): a step in which, after cooling the epoxy resin main ingredient to 50° C. to 70° C., an epoxy resin curing agent, an imidazole compound, and an epoxy resin curing accelerator are added and mixed at 50° C. to 70° C. for 0.5 to 2 hours, thereby obtaining an epoxy resin composition.

<<Prepreg>>

A prepreg of the present invention includes the thermosetting resin composition of the present invention and a reinforcing fiber base material. Specifically, the prepreg is a sheet-like prepreg having a reinforcing fiber base material impregnated with the thermosetting resin composition of the present invention.

The prepreg is used as a single layer or as a laminated body obtained by laminating a plurality of layers as necessary. For example, as illustrated in FIG. 1, a prepreg laminate 1 in which six prepregs 10 are laminated is used.

Reinforcing fibers constituting the reinforcing fiber base material are not particularly limited, and for example, inorganic fibers, organic fibers, metal fibers, or reinforcing fibers having a hybrid configuration of a combination thereof can be used.

Examples of the inorganic fibers include carbon fibers, graphite fibers, silicon carbide fibers, alumina fibers, tungsten carbide fibers, boron fibers, and glass fibers.

Examples of the organic fibers include aramid fibers, high-density polyethylene fibers, other general nylon fibers, and polyester fibers.

Examples of the metal fibers include fibers of stainless steel, iron, and the like, and carbon fibers coated with metal.

Among these, carbon fibers are preferable in consideration of mechanical properties such as the strength of the fiber-reinforced composite material.

The reinforcing fibers of the reinforcing fiber base material may be long fibers or short fibers. Long fibers are preferred because of their excellent rigidity.

Examples of the form of the reinforcing fiber base material include a form in which a large number of long fibers are aligned in one direction to form a UD sheet (unidirectional sheet), a form in which long fibers are woven into a cloth material (fabric), and a form in which short fibers form a nonwoven fabric.

Examples of a method of weaving the cloth material include plain weave, twill weave, satin weave, and triaxial weave.

The fiber basis weight of the reinforcing fiber base material is preferably 50 to 800 g/m$^2$, and more preferably 75 to 300 g/m$^2$.

When the fiber basis weight of the reinforcing fiber base material is equal to or more than the lower limit, the number of laminated layers needed to obtain a formed article having a desired thickness can be reduced. When the fiber basis weight of the reinforcing fiber base material is equal to or less than the upper limit, a prepreg base material in a favorable impregnated state is easily obtained.

The lamination configuration of the prepreg base material is not particularly limited.

For example, in a case of using UD prepreg base materials, a configuration in which the UD prepreg base materials are laminated to cause the fiber axes of the reinforcing fibers of the UD prepreg base materials vertically adjacent to be orthogonal to each other is exemplified.

Regarding the prepreg base materials, only the same type of prepreg base material may be laminated, or different types of prepreg base materials may be laminated.

The number of layers of the prepreg base materials is not particularly limited, and can be appropriately determined according to the required characteristics of the fiber-reinforced composite material and the like.

<<Fiber-Reinforced Composite Material>>

A fiber-reinforced composite material of the present invention is a cured product of the prepreg of the present invention.

The fiber-reinforced composite material is obtained by subjecting the prepreg to heating and pressurization forming.

[Forming Step]

A prepreg laminate obtained by laminating a required number of prepregs is subjected to heating and pressurization forming by a die to obtain a fiber-reinforced composite material.

As a heating and pressurization forming method for the prepreg laminate using the die, a known heating and pressurization forming method can be adopted, and examples thereof include autoclave forming, oven forming, internal pressure forming, and press forming.

Although the press forming facilitates obtaining a fiber-reinforced composite material having a resin layer formed from a resin film on the surface layer compared to other heating and pressurization forming methods, the forming pressure is high and the resin tends to flow out of the die. However, since the thermosetting resin composition of the present invention has excellent rapid curability, the outflow of the resin from the die during the forming can be suppressed. Therefore, the thermosetting resin composition of the present invention is more effective in a case where press forming is adopted in the forming step, and is particularly effective in a case where high cycle press forming is adopted.

For example, a case where a prepreg laminate 1 is press-formed by a die 100 illustrated in FIG. 2 will be described.

The die 100 includes a lower die 110 provided with a protruding portion 112 on the upper surface side and an upper die 120 provided with a recessed portion 122 on the lower surface side. When the upper die 120 is brought close to the lower die 110 and the die 100 is closed, a cavity complementary in shape to the shape of a target fiber-reinforced composite material is formed between the protruding portion 112 and the recessed portion 122 in the die 100.

Figure 2:
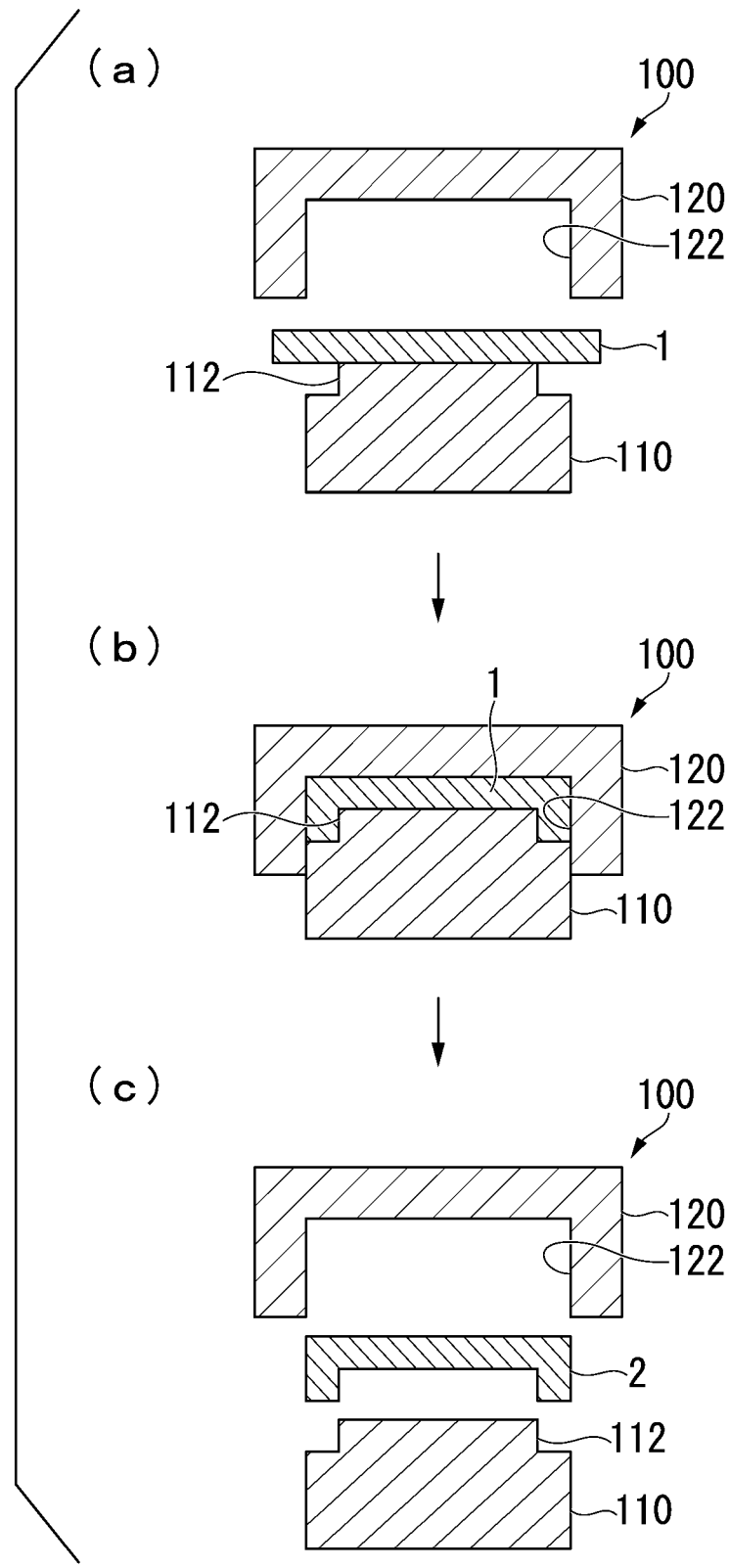
FIG. 2 is a step diagram illustrating an example of a forming step in a production method for a fiber-reinforced composite material.

After disposing the prepreg laminate 1 on the lower die 110 as illustrated in (a) of FIG. 2, the upper die 120 is brought close to the lower die 110 to close the die 100 as illustrated in (b) of FIG. 2, and the prepreg laminate 1 is subjected to heating and pressurization forming. The thermosetting resin composition in the prepreg laminate 1 is cured while flowing by being pressed by the die 100 and heated.

Figure 3:
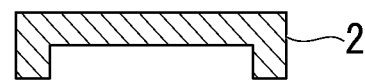
FIG. 3 is a cross-sectional view illustrating an example of the fiber-reinforced composite material.

After the curing, as illustrated in (c) of FIG. 2, the die 100 is opened to take out the fiber-reinforced composite material 2, whereby a fiber-reinforced composite material as illustrated in FIG. 3 is obtained.

As the heating and pressurization forming conditions, known heating and pressurization forming conditions can be adopted except that the prepreg of the present invention (prepreg laminate 1) is used.

The die temperature during heating and pressurization forming is preferably 100° C. to 180° C., and more preferably 120° C. to 160° C.

Through heating at the lower limit or higher, rapid curing can be achieved and the forming cycle can be shortened. Through heating at the upper limit or lower, the resin flow during the forming is suppressed, and a formed article having good appearance can be obtained.

The surface pressure during the heating and pressurization forming is preferably 1 to 15 MPa, and more preferably 4 to 10 MPa.

By applying a pressure equal to or more than the lower limit, the resin flows and the resin composition spreads to every corner of the die, so that a formed article having good appearance is easily obtained. By applying a pressure equal to or less than the upper limit, it is possible to prevent deterioration of the formed appearance due to excessive flow of the resin.

The heating and pressurization forming time is preferably 1 to 15 minutes, more preferably 2 to 8 minutes, and even more preferably 2 to 5 minutes.

Forming for a time equal to or longer than the lower limit enables the production of a resin composition having excellent storage stability and rapid curability. Forming for a time equal to or shorter than the upper limit enables high cycle press forming.

[Shaping Step]

A production method for the fiber-reinforced composite material of the present invention may further include a shaping step of producing a preform having a near net shape of a desired formed article shape by shaping one sheet or two or more overlapping sheets of the prepreg of the present invention. That is, the production method for the fiber-reinforced composite material of the present invention may be a method of performing a laminating step of overlapping two or more sheets of the prepreg of the present invention as necessary, the shaping step, and the forming step in this order.

In this case, the preform having a near net shape of a desired formed article shape is subjected to heating and pressurization forming in the forming step to produce a fiber-reinforced composite material having the desired formed article shape.

A shaping method for the prepreg laminate may be any method as long as the prepreg laminate can be shaped into an intermediate shape based on the shape of a target fiber-reinforced composite material, and a known method can be adopted except that one sheet or two or more overlapping sheets of the prepreg of the present invention are used.

(Heat Resistance)

The glass transition temperature of the fiber-reinforced composite material of the present invention obtained by dynamic viscoelasticity measurement is preferably 135° C. or higher, and more preferably 150° C. or higher.

When the glass transition temperature of the fiber-reinforced composite material is equal to or higher than the lower limit, the fiber-reinforced composite material can be used for a portion requiring high heat resistance.

The glass transition temperature of the fiber-reinforced composite material of the present invention by dynamic viscoelasticity measurement is determined, for example, by the temperature dependence of the storage rigidity (G') obtained by dynamic viscoelasticity measurement of a cured product obtained by placing a prepreg in a die preheated to 140° C., closing the die, and holding the prepreg at 140° C. for 5 minutes while applying a pressure thereto.

EXAMPLES

Hereinafter, the present invention will be described in detail with reference to examples, but the present invention is not limited to the following description.

[Isothermal Viscosity Stability: Measurement of Viscosities V0 and V1 of Thermosetting Resin Composition]

The viscosity of the thermosetting resin composition was measured under the following conditions.

Equipment: Rheometer (manufactured by Thermo Fisher Scientific, "MARS 40")
Plate used: 25φ parallel plate
Plate gap: 0.5 mm
Measurement frequency: 10 rad/sec
Measurement temperature: 60° C.
Measurement time: 5 hours
Stress: 300 Pa The viscosity measurement was started by the above measurement method, the viscosity after 5 minutes was referred to as V0, and the viscosity after 5 hours was referred to as V1.

[Evaluation of 60° C. Isothermal Viscosity Stability]

Evaluation was made from the ratio between the viscosities V0 and V1 according to the following evaluation criteria.

(Evaluation Criteria)

AA: V0/V1 is within 1.0 to 2.0. There is no significant change in viscosity during the preparation of a resin composition and during the production of a prepreg, and a good prepreg can be produced.

A: V0/V1 is within 2.0 to 2.5.

B: V0/V1 is within 2.5 to 4.5.

C: V0/V1 is 4.5 or more. There is a significant change in viscosity during the preparation of a resin composition and during the production of a prepreg, and a good prepreg cannot be produced.

[Curing Time of Curelastometer: Curing Completion Time of Thermosetting Resin Composition]

The curing completion time of the thermosetting resin composition (the time to reach 90% torque of the maximum torque value) was obtained as follows.

A change in the torque value (N·m) at a die temperature of 140° C. was measured using "CURELASTOMETER 7 Type P" manufactured by JSR Trading Co., Ltd. Next, a maximum torque value (Tmax) at which the torque value changes no longer is determined from a torque value change curve, and a torque value of 90% of the maximum torque value (T90) is calculated. The time needed until T90 is reached after the start of the measurement was obtained, and this was taken as the curing completion time (t90). The measurement conditions are shown below.

Equipment: Curelastometer (CURELASTOMETER 7 Type P, manufactured by JSR Trading Co., Ltd.)
Die effective bore diameter: φ160 mm
Measurement temperature: 140° C.

[Measurement of Dynamic Viscoelasticity of Cured Product (Glass Transition Temperature)]

A formed plate obtained in each of the examples and the comparative examples was processed into a test piece having a length of 55 mm and a width of 12.5 mm, and was measured in a torsion mode using Rheometer ARES-RDA manufactured by TA Instruments. At a measurement frequency of 1 Hz and a temperature rising rate of 5° C./min, log G' was plotted against temperature, and the temperature at an intersection between an approximate straight line of a flat region of log G' and an approximate straight line of a region where log G' sharply decreases was taken as the glass transition temperature (G'Tg).

[90-Degree Bending Strength]

The formed plate obtained in each of the examples and comparative examples was cut into a size of 63 mm in length (in the direction orthogonal to the fiber)×12.7 mm in width (in the direction parallel to the fiber) by a wet diamond cutter, and the end face was polished with #1000 sandpaper to produce a test piece. The test piece was subjected to a three-point bending test using a universal tester (manufactured by Instron, Instron 4465, analysis software: Bluehill) according to ASTM D790 under the conditions of an indenter R: 5.0, L/D: 16, and a crosshead speed: 0.92 to 0.94 mm/min, and the 90-degree bending strength was calculated.

[Raw Materials Used]

Raw materials used are shown below.

(Epoxy Resin)

Epoxy resins a-1 and a-2 having the structure represented by Formula (1) in a molecule a-1: Reaction Product of an Epoxy Resin and 4,4'-Diaminodiphenylsulfone A reaction product obtained by mixing a bisphenol A type epoxy resin (product name "jER 828", manufactured by Mitsubishi Chemical Corporation) and 4,4'-diaminodiphenylsulfone (product name: SEIKACURE-S, manufactured by Wakayama Seika Kogyo Co., Ltd.) in a mass ratio of 100:9 at room temperature and thereafter mixing and heating the mixture at 150° C., which is a mixture primarily containing a reaction product of an epoxy resin and an amine compound having at least one sulfur atom in a molecule (epoxy equivalent weight 266 g/eq, viscosity (90° C.) 1.3 Pa·s).

a-2: Dissolved Product of a-1 and Polyethersulfone

A resin composition (I) was obtained by mixing jER 828/polyethersulfone (product name: E2020P, manufactured by BASF)=7/3 (unit: parts by mass) and uniformly dissolving the mixture at 180° C. By mixing 71.67 parts by mass of the a-1 and 23.33 parts by mass of the resin composition (I), a dissolved product of the a-1 and polyethersulfone was obtained. Epoxy equivalent weight 266 g/eq, viscosity (90° C.) 1.3 Pa·s)

N775: Phenol novolac type epoxy resin (product name "N-775", epoxy equivalent weight 189, manufactured by DIC Corporation, proportion of molecules having three or more epoxy groups 90.9%).

jER 828: Bisphenol A type epoxy resin (product name "jER 828", epoxy equivalent weight 189, manufactured by Mitsubishi Chemical Corporation).

jER 1032H60: Trisphenolmethane type epoxy resin (product name "jER 1032H60", epoxy equivalent weight 169, manufactured by Mitsubishi Chemical Corporation, proportion of molecules having three or more epoxy groups 98.4%).

jER 604: Bisphenol A type epoxy resin (product name "jER 604", epoxy equivalent weight 120, manufactured by Mitsubishi Chemical Corporation, proportion of molecules having three or more epoxy groups 100%).

(Epoxy Resin Curing Agent)

Dicy 15: Dicyandiamide (product name "Dicy 15", manufactured by Mitsubishi Chemical Corporation, average particle size 8.3 μm)

Dicy 1400F: Dicyandiamide (product name "Dicyanex 1400F", manufactured by Air Products, average particle size 4.5 μm)

(Imidazole Compound)

2MAOK: 2,4-diamino-6-(2'-methylimidazolyl-(1'))-ethyl-s-triazine/isocyanuric acid addition product (volume average particle size 1.1 μm, product name "CUREZOL 2MAOK-PW"), manufactured by Shikoku Chemicals Corporation).

2MZA: 2,4-diamino-6-(2'-methylimidazolyl-(1))-ethyl-s-triazine (volume average particle size 1.4 μm, product name "CUREZOL 2MZA-PW", manufactured by Shikoku Chemicals Corporation).

(Epoxy Resin Curing Accelerator)

TBDMU: 2,4-bis(3,3-dimethylureido)toluene (product name "Omicure 24", manufactured by PTI Japan, Ltd.).

DCMU: 3-(3,4-dichlorophenyl)-1,1-dimethylurea (product name "DCMU 99", manufactured by Hodogaya Chemical Co., Ltd.).

(Reinforcing Fiber)

Carbon fiber bundle: product name "TRW40 50L", manufactured by Mitsubishi Chemical Corporation, tensile strength 4.1 GPa, tensile modulus 240 GPa, number of filaments 50,000, basis weight 3.75 g/m.

(Curing Start Temperature)

The curing start temperature was calculated as follows.

The curing start temperature was set to a temperature at an intersection between a tangent at an inflection point and a baseline in a DSC curve obtained by measuring a calorific value by a differential scanning calorimeter (DSC) at a temperature rising rate of 10° C./min of a sample resin composition prepared by mixing 10 parts by mass of the target imidazole compound with 100 parts by mass of a bisphenol A type epoxy resin having an epoxy equivalent weight of 189 (jER 828 manufactured by Mitsubishi Chemical Corporation).

The curing start temperature of 2MAOK was 149.1° C., and the curing start temperature of 2MZA was 139.1° C.

(Preparation of Masterbatch)

The components were kneaded at the mass ratios shown in Table 1 below, and then uniformly dispersed with three rolls to prepare masterbatches I-1 to I-7 and II-1 to II-4.

TABLE 1

| Masterbatch | | I-1 | I-2 | I-3 | I-4 | I-5 | I-6 | I-7 | II-1 | II-2 | II-3 | II-4 |
|---|---|---|---|---|---|---|---|---|---|---|---|---|
| Epoxy resin | jER828 | 12 | 12 | 12 | 12 | 12 | 12 | 12 | 12 | 12 | 12 | 12 |
| Epoxy resin curing agent | Dicy15 | 5 | | | | | | | | | | |
| | Dicy1400F | | 5 | 5 | 5 | 5 | 2 | 5 | | 5 | 5 | 5 |
| Epoxy resin curing accelerator | TBDMU | 2 | 2 | 2 | 3 | 2 | 2 | 8 | 4 | 4 | | |
| | DCMU | | | | | | | | | | | 2 |

TABLE 1-continued

| Masterbatch | | I-1 | I-2 | I-3 | I-4 | I-5 | I-6 | I-7 | II-1 | II-2 | II-3 | II-4 |
|---|---|---|---|---|---|---|---|---|---|---|---|---|
| Imidazole compound | 2MAOK | 3 | 3 | 2 | 2 | | 8 | 2 | 4 | | 3 | 2 |
| | 2MZA | | | | | 2 | | | | | | |

Example 1

60 parts by mass of the epoxy resin a-2, 25 parts by mass of N775, and 10 parts by mass of jER 828 were put into a dissolving pot and dissolved at 80° C. Thereafter, the resultant was cooled to 60° C., 22 parts by mass of the masterbatch I-1 was added thereto, and the resultant was further stirred and mixed at 60° C., thereby obtaining a thermosetting resin composition (C-1).

Table 2 shows the evaluation results of the obtained thermosetting resin (C-1).

The thermosetting resin composition (C-1) was applied onto release paper at 60° C. using Multicoater (M-500 type, manufactured by HIRANO TECSEED Co., Ltd.), thereby obtaining a resin film. A carbon fiber bundle was wound on the resin film on a drum winder and then sandwiched between the resin film and the same film to cause the carbon fiber bundle to be impregnated with the thermosetting resin composition (C-1), thereby obtaining a unidirectional prepreg. The basis weight of the carbon fiber bundle was 244 g/m$^2$ and the resin content was 31.0 mass % in the prepreg.

Ten prepregs obtained were laminated with their fiber directions aligned, and were press-formed (forming temperature: 140° C., forming time: 5 minutes), thereby obtaining a formed plate (fiber-reinforced composite material).

Table 2 shows the evaluation results of the obtained formed plate.

Examples 2 to 7

Thermosetting resin compositions (C-2) to (C-7) were prepared in the same manner as in Example 1, except that the component composition and the resin content were changed as shown in Table 2.

Using the obtained thermosetting resin compositions (C-2) to (C-7), resin films were prepared in the same manner as in Example 1, thereby obtaining formed plates.

Table 2 shows the evaluation results of the obtained thermosetting resin compositions (C-2) to (C-7), and the formed plates obtained from the thermosetting resin compositions.

Comparative Examples 1 to 4

Thermosetting resin compositions (X-1) to (X-4) were prepared in the same manner as in Example 1, except that the component composition and the resin content were changed as shown in Table 2.

Using the obtained thermosetting resin compositions (X-1) to (X-4), resin films were prepared in the same manner as in Example 1, thereby obtaining formed plates.

Table 2 shows the evaluation results of the obtained thermosetting resin compositions (X-1) to (X-4) and the formed plates obtained from the thermosetting resin compositions.

TABLE 2

| | | Example | | | | | | | Comparative Example | | | |
|---|---|---|---|---|---|---|---|---|---|---|---|---|
| | | 1 | 2 | 3 | 4 | 5 | 6 | 7 | 1 | 2 | 3 | 4 |
| Thermosetting resin composition | | C-1 | C-2 | C-3 | C-4 | C-5 | C-6 | C-7 | X-1 | X-2 | X-3 | X-4 |
| Epoxy resin | a-1 | | | | 45 | | | | | | | |
| | a-2 | 60 | 55 | 65 | | 65 | 60 | 60 | 55 | 55 | 55 | 55 |
| | N775 | 25 | 30 | 10 | | 30 | 25 | 25 | 30 | 30 | 30 | 30 |
| | jER828 | 10 | 10 | | 20 | | 10 | 10 | 10 | 10 | 10 | 10 |
| | jER1032H60 | | | | 30 | | | | | | | |
| | jER604 | | | 20 | | | | | | | | |
| Masterbatch | | 22 | 22 | 21 | 22 | 21 | 24 | 27 | 20 | 21 | 20 | 21 |
| | | (I-1) | (I-2) | (I-3) | (I-4) | (I-5) | (I-6) | (I-7) | (II-1) | (II-2) | (II-3) | (II-4) |
| Content (%) of a-1 or a-2 in total epoxy resin | | 44.1 | 40.3 | 48.0 | 42.1 | 48.0 | 44.1 | 44.1 | 40.3 | 40.3 | 40.3 | 40.3 |
| Content (%) of polyfunctional epoxy resin | | 22.2 | 26.5 | 28.5 | 27.6 | 26.7 | 22.2 | 22.2 | 26.5 | 26.5 | 26.5 | 26.5 |
| Isothermal viscosity stability V0/V1 | | 1.90 | 1.35 | 1.65 | 2.37 | 3.22 | 2.62 | 3.04 | 4.88 | 1.59 | 1.08 | 1.33 |
| Evaluation of 60° C. isothermal viscosity stability | | AA | AA | AA | A | B | B | B | C | AA | AA | AA |
| Curing completion time (min) | | 4.38 | 4.52 | 5.46 | 5.40 | 5.23 | 4.77 | 4.07 | 7.01 | 6.57 | 6.55 | 6.85 |
| Glass transition temperature (° C.) | | 151 | 154 | 163 | 158 | 163 | — | — | 142 | 135 | 160 | 148 |
| 90-degree bending strength | | 101 | 110 | 118 | 110 | 118 | — | — | 96 | 103 | 47 | 53 |

In Table 2, the numerical values of the raw materials indicate parts by mass used. The symbol in parentheses in the masterbatch indicates the type of the masterbatch used, and the numerical value indicates parts by mass of the masterbatch used.

As shown in Table 2, in Examples 1 to 5 using the thermosetting resin compositions (C-1) to (C-5), it was shown that the fiber-reinforced composite materials were resin compositions that had both rapid curability that enabled high cycle press forming and storage stability required for the production of prepreg while achieving both high heat resistance and high 90-degree bending strength.

In Examples 6 and 7, it was shown that rapid curability that enabled high cycle press forming was exhibited.

In Comparative Example 1 using the thermosetting resin composition (X-1), since dicyandiamide or a derivative thereof was not contained, stability at 60° C. was low, and rapid curability suitable for high cycle press forming was not provided. Furthermore, the obtained formed plate was low in both heat resistance and 90-degree bending strength.

In Comparative Example 2 using the thermosetting resin composition (X-2), since an imidazole compound was not contained, rapid curability suitable for high cycle press forming was not provided. Furthermore, the obtained formed plate had low heat resistance.

In Comparative Examples 3 and 4 using the curable resin composition (X-3) or the curable resin composition (X-4), since a urea derivative having two dimethylureido groups in a molecule was not contained, rapid curability suitable for high cycle press forming was not provided. Furthermore, the obtained formed plate had low 90-degree bending strength.

INDUSTRIAL APPLICABILITY

The present invention is applicable to various uses, and is particularly useful as a material for industrial use, especially for vehicles.

REFERENCE SIGNS LIST

1: Prepreg laminate
2: Fiber-reinforced composite material
3: Flat plate portion
4: Side portion
10: Prepreg
100: Die
110: Lower die
112: Protruding portion
120: Upper die
122: Recessed portion

The invention claimed is:
1. A thermosetting resin composition comprising:
an epoxy resin;
an epoxy resin curing agent;
an imidazole compound; and
an epoxy resin curing accelerator,
wherein the epoxy resin curing agent comprises dicyandiamide or a derivative thereof,
the epoxy resin curing accelerator comprises a urea derivative having two or more dimethylureido groups in a molecule,
the thermosetting resin composition comprises 1 to 9 parts by mass of the dicyandiamide or a derivative thereof, 1 to 8 parts by mass of the imidazole compound, and 1 to 8 parts by mass of the urea derivative having two or more dimethylureido groups in a molecule, each with respect to 100 parts by mass of the epoxy resin, and
the epoxy resin comprises 30 to 70 parts by mass of a first epoxy resin having a structure represented by Formula (1) in a molecule, and 20 to 40 parts by mass of a second epoxy resin, each relative to 100 parts by mass of the epoxy resin,

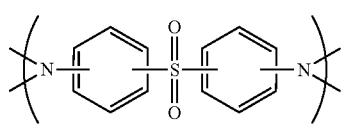
(1)

wherein the second epoxy resin is a polyfunctional epoxy resin having three or more epoxy groups in a molecule, and the polyfunctional epoxy resin does not contain the structure represented by Formula (1).

2. The thermosetting resin composition according to claim 1, wherein a curing completion time is 6 minutes or shorter at 140° C.

3. The thermosetting resin composition according to claim 1, wherein, when a viscosity after holding at 60° C. for 5 minutes is V0 and a viscosity after holding at 60° C. for 5 hours is V1, V1/V0 is 1.0 to 4.5.

4. The thermosetting resin composition according to claim 1, wherein the imidazole compound comprises an imidazole compound having a curing start temperature of 100° C. or higher.

5. The thermosetting resin composition according to claim 1, wherein the imidazole compound comprises at least one selected from the group consisting of an imidazole derivative, an imidazole adduct, an inclusion compound of imidazole, a microencapsulated imidazole, and an addition product comprising imidazole.

6. The thermosetting resin composition according to claim 1, wherein the urea derivative having two or more dimethylureido groups in a molecule comprises one or both of 2,4-bis(3,3-dimethylureido)toluene and 4,4'-methylene bis(phenyldimethylurea).

7. The thermosetting resin composition according to claim 1, wherein the polyfunctional epoxy resin having three or more epoxy groups in a molecule comprises at least one selected from the group consisting of a phenol novolac type epoxy resin, a trisphenolmethane type epoxy resin, and a tetraglycidyl diaminodiphenylmethane.

8. A prepreg comprising:
the thermosetting resin composition according to claim 1; and
a reinforcing fiber base material.

9. The prepreg according to claim 8, wherein a cured product obtained by holding the prepreg at 140° C. for 5 minutes while applying a pressure thereto has a glass transition temperature of 150° C. or higher.

10. A fiber-reinforced composite which is a cured product of the prepreg according to claim 8.

11. The fiber-reinforced composite according to claim 10, which has a glass transition temperature of 150° C. or higher.

12. A method of producing a fiber-reinforced composite, the method comprising:
curing a prepreg according to claim 8 to produce the fiber-reinforced composite.

13. The method according to claim 12, wherein the fiber-reinforced composite has a glass transition temperature of 150° C. or higher.

14. A method of producing a fiber-reinforced composite, the method comprising:
subjecting the prepreg according to claim 8 to heating and pressurization forming.

15. The method according to claim 14, the method further comprising:
shaping the prepreg according to claim 8, prior to the heating and pressurizing forming, to produce a preform having a near net shape of the fiber reinforced composite which is to be produced by the heating and pressurizing forming.

16. The method according to claim 14, wherein the fiber-reinforced composite has a glass transition temperature of 150° C. or higher.

* * * * *